United States Patent
Shin

(10) Patent No.: US 12,366,747 B2
(45) Date of Patent: Jul. 22, 2025

(54) HEAD-UP DISPLAY DEVICE AND CONTROL METHOD THEREOF

(71) Applicant: HYUNDAI MOBIS CO., LTD., Seoul (KR)

(72) Inventor: Min Ho Shin, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 623 days.

(21) Appl. No.: 17/720,433

(22) Filed: Apr. 14, 2022

(65) Prior Publication Data

US 2023/0258931 A1    Aug. 17, 2023

(30) Foreign Application Priority Data

Feb. 16, 2022   (KR) .................. 10-2022-0020024

(51) Int. Cl.
   *G02B 27/01*   (2006.01)
   *B60K 35/00*   (2006.01)
   (Continued)

(52) U.S. Cl.
   CPC .......... *G02B 27/0101* (2013.01); *B60K 35/00* (2013.01); *G02B 27/0093* (2013.01);
   (Continued)

(58) Field of Classification Search
   CPC .. G02B 27/01; G02B 27/017; G02B 27/0101; G02B 27/0103; G02B 27/0093; G02B 27/283; G02B 2027/011; G02B 2027/014; G02B 2027/0134; G02B 2027/0138; G02B 2027/0187; B60K 35/00; B60K 35/10;
   (Continued)

(56) References Cited

U.S. PATENT DOCUMENTS

2016/0238845 A1\*   8/2016   Alexander .......... G02B 27/0081
2017/0038583 A1\*   2/2017   Kim .................... G02B 27/0149
(Continued)

FOREIGN PATENT DOCUMENTS

DE   102014003351 A1   9/2015
DE   102016224162 A1   6/2018
(Continued)

OTHER PUBLICATIONS

Office Action issued Apr. 23, 2024 in corresponding Korean Patent Application No. 10-2022-0020024.
(Continued)

*Primary Examiner* — Sultan Chowdhury
(74) *Attorney, Agent, or Firm* — Novo TechIP International PLLC

(57) ABSTRACT

According to at least one aspect, the present disclosure provides a head-up display (HUD) configured to display information on a windshield of a vehicle, comprising: a sensing unit configured to detect positions of a driver's eyes; a picture generation unit (PGU) configured to separate and output a plurality of images; a controller configured to select, from the plurality of images, two images to be output by the PGU based on the detected positions of the driver's eyes and control the PGU to output the selected two images alternately; and a reflection unit configured to reflect the two images output by the PGU.

19 Claims, 3 Drawing Sheets

(51) Int. Cl.
 *G02B 27/00* (2006.01)
 *B60K 35/23* (2024.01)
(52) U.S. Cl.
 CPC .......... *G02B 27/0179* (2013.01); *B60K 35/23* (2024.01); *G02B 2027/0138* (2013.01); *G02B 2027/014* (2013.01); *G02B 2027/0187* (2013.01)
(58) Field of Classification Search
 CPC ........ B60K 35/22; B60K 35/35; B60K 35/60; B60K 35/235
 See application file for complete search history.

(56) References Cited

U.S. PATENT DOCUMENTS

| | | | | |
|---|---|---|---|---|
| 2018/0101007 | A1* | 4/2018 | Asai | G02B 27/0101 |
| 2020/0018977 | A1* | 1/2020 | Qin | G02B 5/10 |
| 2021/0107356 | A1* | 4/2021 | Watanabe | G06V 20/20 |
| 2021/0382304 | A1* | 12/2021 | You | G02B 3/00 |
| 2022/0043258 | A1* | 2/2022 | Shin | B60K 35/00 |

FOREIGN PATENT DOCUMENTS

| | | |
|---|---|---|
| JP | 2019-201278 A | 11/2019 |
| KR | 10-2013-0112281 A | 10/2013 |
| KR | 2021-0152625 A | 12/2021 |
| KR | 10-2019-0012630 A | 5/2022 |

OTHER PUBLICATIONS

German Office Action issued Sep. 20, 2022 in corresponding German Patent Application No. 102022110791.4.

* cited by examiner

HEAD-UP DISPLAY DEVICE AND CONTROL METHOD THEREOF

CROSS-REFERENCE TO RELATED APPLICATION

This application claims priority to and the benefit of Korean Patent Application No. 10-2022-0020024, filed on Feb. 16, 2022, the disclosure of which is incorporated herein by reference in its entirety.

TECHNICAL FIELD

The present disclosure relates to a head-up display device and a control method thereof.

BACKGROUND

The content described in this section simply provides background information on the present disclosure and does not constitute the prior art.

A head-up display (HUD) device is a device that displays, on a windshield of a vehicle, various information related to the driving of a vehicle, such as driving speed, navigation, and fuel volume, (hereinafter, vehicle driving information), to allow a driver to see them. The driver can easily see the vehicle driving information using the head-up display device, so that even while driving, the driver can look ahead with little distraction.

The head-up display device may include a housing with an accommodation space formed therein, a picture generation unit (PGU) for outputting an image of vehicle driving information, a reflection unit for reflecting the image, and the like. The head-up display device is installed under the windshield of the vehicle due to its characteristics.

In order to provide various information to the driver of the vehicle, it is necessary to display a large-sized image on the windshield. By reflecting the image output from the PGU using a high magnification mirror, a large image may be displayed on the windshield of the vehicle. However, when an image is reflected using the high magnification mirror, binocular disparity occurs, and when the high magnification mirror and the PGU are arranged at a wide interval to compensate for binocular disparity, there is a problem in that the package size of the head-up display device increases.

In order to compensate for binocular disparity without increasing the package size of the head-up display device, an image for a left eye and an image for a right eye may be separated and output alternately. However, the same image may enter one eye of a driver with a narrow gap between the left and the right eye, and thus binocular disparity may not be compensated.

SUMMARY

According to at least one aspect, the present disclosure provides a head-up display (HUD) configured to display information on a windshield of a vehicle, comprising: a sensing unit configured to detect positions of a driver's eyes; a picture generation unit (PGU) configured to separate and output a plurality of images; a controller configured to select, from the plurality of images, two images to be output by the PGU based on the detected positions of the driver's eyes and control the PGU to output the selected two images alternately; and a reflection unit configured to reflect the two images output by the PGU.

According to another aspect, the present disclosure provides a method for displaying information via a head-up display (HUD) of a vehicle, comprising: detecting positions of a driver's eyes; selecting, from a plurality of images two images to be output via the HUD based on the detected positions of the driver's eyes; and separating and outputting the selected two images alternately via the HUD.

REFERENCE NUMERICALS

Figure 1:
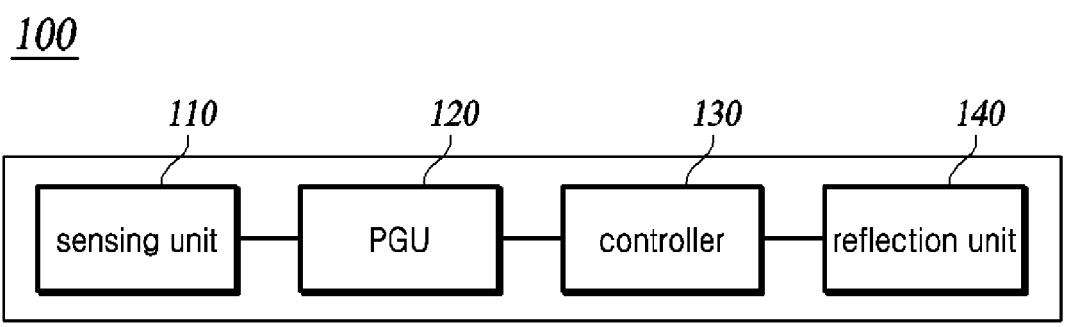
FIG. 1 is a block diagram of a head-up display device according to one embodiment of the present disclosure.

100: head-up display device
110: sensing unit
120: PGU
130: controller
140: reflection unit

DETAILED DESCRIPTION

In view of the above, the present disclosure provides a head-up display device capable of compensating for binocular disparity caused by a high magnification mirror while reducing a package size of the device by displaying a plurality of images separately and alternately.

Further, the present disclosure provides a head-up display device capable of preventing the same image from entering one eye of a driver with a narrow gap between the left eye and the right eye by displaying a plurality of images separately depending on a distance between the left eye and the right eye of a driver.

The object to be achieved by the present disclosure is not limited to the above-mentioned object, and other objectives not mentioned will be clearly understood by those skilled in the art from the following description.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit,' 'module,' and the like refer to one or more units for processing at least one function or operation, which may be implemented by hardware, software, or a combination thereof.

FIG. 1 is a block diagram of a head-up display device according to one embodiment of the present disclosure.

Figure 2:
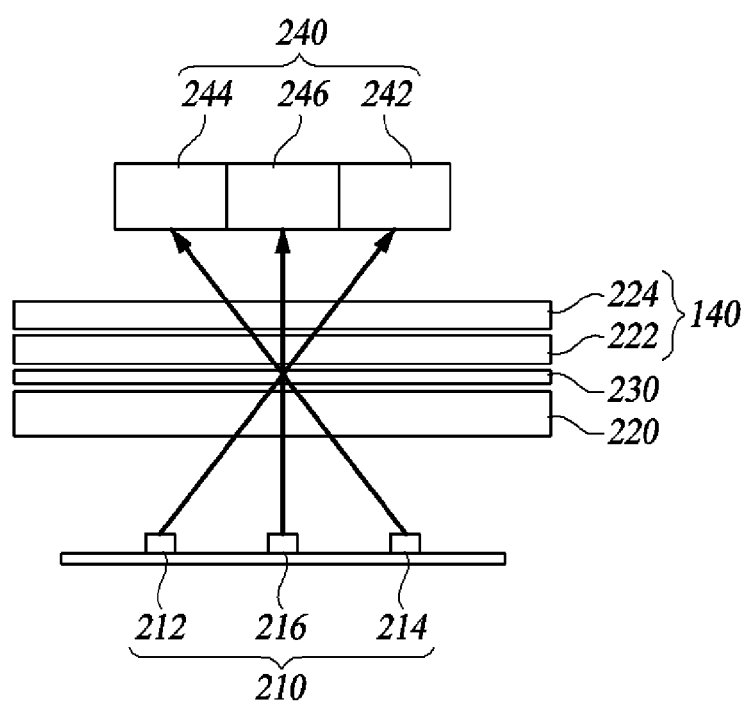
FIG. 2 is a conceptual diagram of the head-up display device according to one embodiment of the present disclosure.

FIG. 2 is a conceptual diagram of the head-up display device according to one embodiment of the present disclosure.

Referring to FIGS. 1 and 2, a head-up display device 100 according to one embodiment of the present disclosure may include a sensing unit 110, a picture generation unit (PGU) 120, a controller 130, and a reflection unit 140.

The PGU 120 may include a plurality of light sources 210, a back light unit (BLU) 220, and a liquid crystal display (LCD) 230.

The plurality of light sources 210 may include a left-eye light source 212, a right-eye light source 214, and a central light source 216.

The reflection unit 140 may include a first reflection member 222 and a second reflection member 224.

The sensing unit 110 detects positions of the driver's eyes. The sensing unit 110 may detect a distance between the left eye and the right eye of the driver. The sensing unit 110 transmits the acquired information to the controller 130. The controller 130 controls the PGU 120 based on the information acquired by the sensing unit 110. The sensing unit 110 may include at least one of a camera and a pupil perception sensor.

The PGU 120 may include the light source 210, the BLU 220, and the LCD 230. The PGU 120 outputs an image related to driving information of a vehicle. The PGU 120 may be configured to separate and output a plurality of images. The PGU 120 may separate and output the image for the left eye and the image for the right eye. The PGU 120 may be configured to separate and output a plurality of images, for example, an n number of images, wherein the n is a natural number equal to or greater than 2. When the PGU 120 is configured to output the n number of images, two images to be output by the PGU 120 may be determined or selected based on the positions of the driver's eyes. n may be determined based on the distance between the left eye and the right eye of the driver and a preset length of an eyebox 240. Specifically, n may be determined as the smallest natural number among natural numbers equal to or greater than a value obtained by dividing the length of the eyebox 240 by the distance between the left eye and right eye of the driver. Here, the length of the eyebox 240 may be 130 mm, the distance between the left eye and the right eye of the driver may be 50 to 80 mm, and n may be 3.

The controller 130 controls the PGU 120 so that the PGU 120 alternately outputs a plurality of images. When the positions of the driver's eyes are changed, the controller 130 controls the PGU 120 to modify or correct the plurality of images, respectively. The PGU 120 is disposed behind the reflection unit 140 on a traveling path of light emitted from the light source 210. Here, the front indicates a point relatively close to the driver's eyes on the traveling path of light, and the rear indicates a point relatively close to the light source 210.

The light source 210 is a device that emits light so that an image of driving information of the vehicle is displayed. A plurality of light sources 210 may be provided. The light source 210 is disposed behind the BLU 220. The light source 210 may include a left-eye light source 212, a right-eye light source 214, and a central light source 216. The central light source 216 may be disposed between the left-eye light source 212 and the right-eye light source 214. Each of the plurality of light sources 210 may include at least one light emitting diode (LED). The controller 130 controls the light source 210 such that the plurality of light sources 210 alternately emit light. The light emitted from the left-eye light source 212 may enter a left-eye region 242 of the eyebox 240. The light emitted from the right-eye light source 214 may enter a right-eye region 244 of the eyebox 240. The light emitted from the central light source 216 may enter a central region 246 of the eyebox 240. Here, the light entering the left-eye region 242 may enter the driver's left eye, the light entering the right-eye region 244 may enter the driver's right eye, and the light entering the central region 246 may enter the driver's left or right eye. The direction of light emitted from each light source 210 may be adjusted by the BLU 220.

The number of light sources 210 may be n. Here, n indicates a natural number of 2 or more. n may be determined based on a distance between the left eye and the right eye of the driver and the length of the eyebox 240. Specifically, n may be determined as the smallest natural number among natural numbers equal to or greater than a value obtained by dividing the length of the eyebox 240 by the distance between the left eye and the right eye of the driver.

The BLU 220 is disposed between the light source 210 and the LCD 230. The BLU 220 is configured to adjust the direction of light emitted from the light source 210. The BLU 220 adjusts the direction of light so that the light emitted from the left-eye light source 212 enters the left eye region 242 of the eyebox 240. The BLU 220 adjusts the direction of light so that the light emitted from the right-eye light source 214 enters the right eye region 244 of the eyebox 240. The BLU 220 adjusts the direction of light so that the light emitted from the central light source 216 enters the central region 246 of the eyebox 240.

The LCD 230 is a device that outputs an image related to the driving information of the vehicle, and is disposed between the BLU 220 and the reflection unit 140. The LCD 230 outputs an image using the light emitted from the light source 210. The controller 130 may control the LCD 230 to separate and output a plurality of images alternately. The LCD 230 outputs an image in a direction toward the reflection unit 140.

The controller 130 controls the PGU 120 to separate and output a plurality of images alternately. The controller 130 may control the left-eye light source 212, the right-eye light source 214, the central light source 216, and the LCD 230 so that the PGU 120 separates and outputs the image for the left eye and the image for the right eye alternately. By separating and outputting the image for the left eye and the image for the right eye alternately, it is possible to compensate binocular disparity caused by using a high magnification mirror without increasing the size of the head-up display device 100. The head-up display device 100 according to one embodiment of the present disclosure can display a large image on a windshield of a vehicle, reduce the size of its package, and compensate for binocular disparity.

The controller 130 may receive information acquired by the sensing unit 110 from the sensing unit 110. The controller 130 receives information on the positions of the driver's eyes from the sensing unit 110. The controller 130 may receive information on a distance between the left eye and the right eye of the driver from the sensing unit 110. The controller 130 may calculate the distance between the left eye and the right eye of the driver based on information on the positions of the driver's eyes transmitted from the sensing unit 110. The controller 130 may control the PGU 120 based on the information acquired by the sensing unit 110. The controller 130 may control the PGU 120 to modify or correct an image of the driving information of the vehicle depending on the positions of the driver's eyes. The plurality of images output by the PGU 120 may be independently modified or corrected.

When the PGU 120 is configured to output the n number of images, the controller 130 may determine or select two images to be output by the PGU 120 based on the positions of the driver's eyes. The controller 130 may control the PGU 120 to alternately output two images. Since the PGU 120 is configured to output the n number of images and the controller 130 determines or selects two images to be output by the PGU 120 based on the positions of the driver's eyes, it is possible to prevent the same image from entering one eye of the driver with a narrow gap between the left and right eye.

The reflection unit 140 is disposed in front of the PGU 120. A plurality of reflection units 140 may be provided. The reflection unit 140 reflects the image output from the PGU 120 and displays the image on the windshield of the vehicle, so that the driver can see the image of the driving information of the vehicle. The reflection unit 140 may enlarge the image output from the PGU 120 and display the enlarged image on the windshield of the vehicle.

The first reflection member 222 is disposed in front of the PGU 120. The first reflection member 222 reflects the image output from the PGU 120 toward the second reflection member 224. The first reflection member 222 may be a planar mirror.

The second reflection member 224 is disposed in front of the first reflection member 222. The second reflection member 224 reflects an image reflected by the first reflection member 222 and displays the reflected image on the windshield of the vehicle. A curve may be formed on at least a part of the second reflection member 224 so that the second reflection member 224 enlarges and reflects an image.

Figure 3:
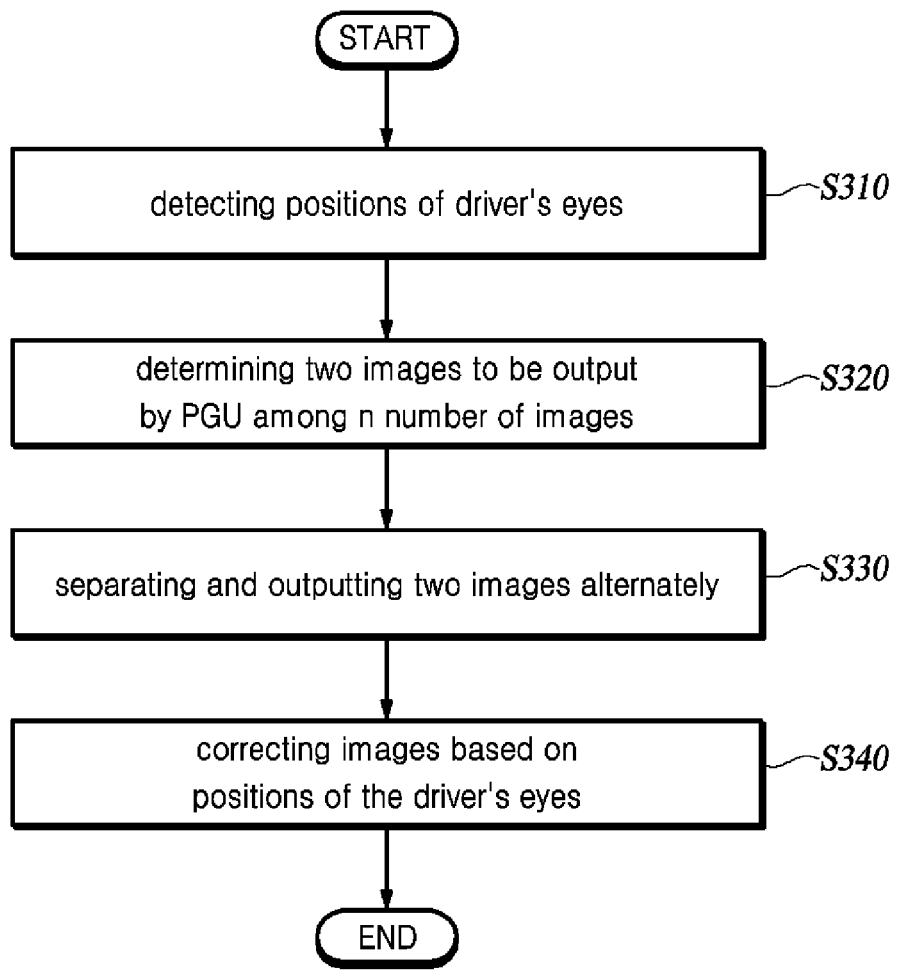
FIG. 3 is a flowchart of a method of controlling the head-up display device according to one embodiment of the present disclosure.

FIG. 3 is a flowchart of a method of controlling the head-up display device according to one embodiment of the present disclosure.

The sensing unit 110 detects the positions of the driver's eyes (S310). The sensing unit 110 may detect the positions of the driver's eyes and a distance between the left eye and the right eye of the driver. The sensing unit 110 may detect the positions of the driver's eyes and the distance between the left eye and the right eye of the driver using at least one of a camera and a pupil perception sensor. The sensing unit 110 may transmit the acquired information to the controller 130. The controller 130 may control the PGU 120 based on the information acquired by the sensing unit 110.

The controller determines or selects two images to be output by the PGU among the n number of images (S320). The PGU 120 of the head-up display device 100 according to one embodiment of the present disclosure is configured to output the n number of images. Here, n indicates a natural number greater than or equal to 2. The controller 130 may determine or select two images to be output by the PGU 120 based on the positions of the driver's eyes. The PGU 120 is configured to output the n number of images, and the controller 130 determines or selects two images to be output by the PGU 120 based on the positions of the driver's eyes, so that it is possible to prevent the same image from entering one eye of a driver with a narrow gap between the left and the right eye.

The PGU separates and outputs two images alternately (S330). The controller 130 controls the PGU 120 to separate and output the two images alternately. By separating and outputting the two images alternately, it is possible to compensate for binocular disparity caused by using a high magnification mirror can be compensated without increasing the size of the head-up display device 100.

The controller 130 modifies or corrects the images based on the positions of the driver's eyes (S340). The controller 130 controls the PGU 120 to modify or correct the image depending on the positions of the driver's eyes. A plurality of images output by the PGU 120 may be independently modified or corrected. The image is modified or corrected based on the positions of the driver's eyes to prevent image distortion caused by the change of the positions of the driver's eyes.

According to one embodiment, by displaying a plurality of images separately and alternately, the head-up display device can compensate for binocular disparity caused by the high magnification mirror while reducing the package size.

According to one embodiment, the head-up display device can prevent the same image from entering one eye of a driver with a narrow gap between the left and the right eye by displaying a plurality of images separately depending on the distance between the left eye and the right eye of the driver.

Although it is described that the processes are sequentially executed in the flowchart of the present disclosure, this is merely illustrative of the technical idea of some embodiments of the present disclosure. In other words, since an ordinary skilled person in the art to which the embodiments of the present disclosure pertain may make various modifications and changes by changing the processes described in the flowchart/timing diagram or performing one or more of the processes in parallel without departing from the essential characteristics of the embodiments of the present disclosure, the flowchart/timing diagram is not limited to a time-series order.

Various implementations of the systems and techniques described herein may be realized by digital electronic circuits, integrated circuits, field programmable gate arrays (FPGAs), application specific integrated circuits (ASICs), computer hardware, firmware, software, and/or combination thereof. These various implementations may include an implementation by one or more computer programs executable on a programmable system. The programmable system includes at least one programmable processor (which may be a special purpose processor or a general-purpose processor) coupled to a storage system, at least one input device, and at least one output device to receive and transmit data and instructions therefrom and thereto. Computer programs (also known as programs, software, software applications or codes) contain instructions for the programmable processor and are stored in a "computer-readable recording medium".

The computer-readable recording medium includes all types of recording devices in which data readable by a computer system is stored. The computer-readable recording medium may include non-volatile or non-transitory mediums such as ROM, RAM, CD-ROM, magnetic tape, floppy disk, memory card, hard disk, optical disk, and storage device, and may further include a temporary medium such as a data transmission medium. In addition, the computer-readable recording medium may be distributed in a network-connected computer system, and computer-readable codes may be stored and executed in a distributed manner.

Various implementations of systems and techniques described herein may be implemented by a programmable computer. Here, the computer includes a programmable processor, a data storage system (including a volatile memory, a nonvolatile memory, or another type of storage system or a combination thereof), and at least one communication interface. For example, a programmable computer may be one of a server, a network device, a set-top box, a built-in device, a computer expansion module, a personal computer, a laptop, a personal data assistant (PDA), a cloud computing system, and a mobile device.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. A head-up display (HUD) configured to display information on a windshield of a vehicle, comprising:
    a sensing unit configured to detect positions of a driver' eyes;
    a picture generation unit (PGU) configured to separate and output a plurality of images;
    a controller configured to select, from the plurality of images, two images to be output by the PGU based on the detected positions of the driver's eyes and control the PGU to output the selected two images alternately; and
    a reflection unit configured to reflect the two images output by the PGU.

2. The HUD of claim 1, wherein
    the controller is configured to control the PGU to modify the two images based on the detected positions of the driver's eyes.

3. The HUD of claim 1, wherein
    the sensing unit includes a camera or a pupil perception sensor.

4. The HUD of claim 1, wherein
    a number of the plurality of images output by the PGU is 3.

5. The HUD of claim 4, wherein
    the PGU includes a left-eye light source, a right-eye light source, and a central light source positioned between the left-eye light source and the right-eye light source.

6. The HUD of claim 5, wherein
    the left-eye light source, the right-eye light source, and the central light source each include at least one light emitting diode (LED).

7. The HUD of claim 5, wherein
    the PGU further includes a back light unit (BLU) configured to adjust a direction of light emitted from the left-eye light source, the right-eye light source, and the central light source.

8. A head-up display (HUD) configured to display information on a windshield of a vehicle, comprising:
    a sensing unit configured to detect positions of a driver's eyes;
    a picture generation unit (PGU) configured to separate and output a plurality of images;
    a controller configured to select, from the plurality of images, two images to be output by the PGU based on the detected positions of the driver's eyes and control the PGU to output the selected two images alternately; and
    a reflection unit configured to reflect the two images output by the PGU,
    wherein
    a number of the plurality of images output by the PGU is determined based on at least one of a distance between the driver's eyes and a preset length of an eye box.

9. The HUD of claim 8, wherein
    the number of the plurality images output by the PGU is determined by dividing the length of the eye box by the distance between the driver's eyes.

10. The HUD of claim 8, wherein a number of the plurality of images output by the PGU is determined based on a distance between the driver's eyes.

11. The HUD of claim 8, wherein a number of the plurality of images output by the PGU is determined based on a preset length of an eye box.

12. The HUD of claim 8, wherein a number of the plurality of images is greater than 2.

13. A method for displaying information via a head-up display (HUD) of a vehicle, comprising:
    detecting positions of a driver's eyes;
    selecting, from a plurality of images, two images to be output via the HUD based on the detected positions of the driver's eyes; and
    separating and outputting the selected two images alternately via the HUD.

14. The control method of claim 13, further comprising:
    modifying the selected two images based on the detected positions of the driver's eyes.

15. The control method of claim 13, wherein
    detecting the positions of the driver's eyes includes detecting the positions of the driver's eyes using a camera or a pupil perception sensor.

16. The control method of claim 13, wherein a number of the plurality of images output by the PGU is determined based on a distance between the driver's eyes.

17. The control method of claim 13, wherein a number of the plurality of images output by the PGU is determined based on a preset length of an eye box.

18. The control method of claim 13, wherein a number of the plurality of images is greater than 2.

19. The control method of claim 13, wherein a number of the plurality of images output by the PGU is determined based on at least one of a distance between the driver's eyes and a preset length of an eye box.

* * * * *